(12) United States Patent
Naka

(10) Patent No.: US 7,120,009 B2
(45) Date of Patent: Oct. 10, 2006

(54) CAPACITOR ELEMENT FOR SOLID ELECTROLYTIC CAPACITOR AND METHOD OF MAKING THE SAME

(75) Inventor: Kentarou Naka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 3 days.

(21) Appl. No.: 11/227,473

(22) Filed: Sep. 15, 2005

(65) Prior Publication Data

US 2006/0056135 A1   Mar. 16, 2006

(30) Foreign Application Priority Data

Sep. 16, 2004   (JP)   ............... 2004-269876

(51) Int. Cl.
*H01G 9/02* (2006.01)
(52) U.S. Cl. .............. 361/525; 361/504; 29/25.03
(58) Field of Classification Search ............. 361/525, 361/523, 528–529, 532–534, 504, 516; 29/26.03
See application file for complete search history.

(56) References Cited

U.S. PATENT DOCUMENTS 3,686,535 A * 8/1972 Piper et al. ............... 361/529
5,461,538 A   10/1995 Kuriyama
6,151,205 A * 11/2000 Kobayashi et al. ........ 361/523
6,334,879 B1 * 1/2002 Muffoletto et al. ....... 29/25.03
6,661,645 B1 * 12/2003 Sakai et al. ............... 361/523

FOREIGN PATENT DOCUMENTS

JP   60-220922   11/1985
JP   7-74062    3/1995

* cited by examiner

*Primary Examiner*—Anthony Dinkins
(74) *Attorney, Agent, or Firm*—Hamre, Schumann, Mueller & Larson, P.C.

(57) ABSTRACT

The capacitor element includes a chip body 2 prepared by compacting valve metal powder into a porous body and sintering the body, and an anode bar 3 fixed to the chip body so as to project from an end surface 2a of the chip body. A solid electrolyte layer 5 of conductive polymer is formed on the chip body via a dielectric film 4. A cathode film 6 is formed on the solid electrolyte layer. The solid electrolyte layer 5 formed at the end surface 2a of the chip body 2 includes carbide 5a formed by pyrolysis of the solid electrolyte layer to surround the entire circumference of the anode bar 3, so that damage is prevented from occurring at the root portion of the anode bar.

3 Claims, 5 Drawing Sheets

CAPACITOR ELEMENT FOR SOLID ELECTROLYTIC CAPACITOR AND METHOD OF MAKING THE SAME

TECHNICAL FIELD

The present invention relates to a solid electrolytic capacitor utilizing valve metal such as tantalum or niobium and particularly relates to a capacitor element to be incorporated in the capacitor and a method of making such a capacitor element.

BACKGROUND ART

Conventionally, as disclosed in JP-A7-74062, for example, such kind of capacitor element is manufactured as follows.

First, as shown in FIG. 4, valve metal powder such as tantalum powder is compacted into a porous chip body 2 so that an anode bar 3 is fixed to an end surface 2a of the chip body 2, and then the chip body is heated to a high temperature for sintering the valve metal powder.

Subsequently, as shown in FIG. 5, a highly insulating dielectric film 4 of e.g. tantalum pentoxide is formed on particle surfaces of the valve metal powder constituting the chip body 2 so that the dielectric film extends up to the obverse surface of the anode bar 3.

Then, as shown in FIG. 6, a solid electrolyte layer 5 of a conductive polymer is formed on the dielectric film 4.

Subsequently, as shown in FIG. 7, a cathode film 6 having a two-layer structure consisting of a graphite layer as the underlying layer and a metal layer as the upper layer is formed on the solid electrolyte layer 5, whereby the capacitor element 1 is provided.

As disclosed in JP-A 60-220922, for example, and shown in FIG. 8, the capacitor element 1 manufactured in the above-described manner is placed between a pair of lead terminals 7 and 8. The anode bar 3 of the capacitor element 1 is fixed to the lead terminal 7 by e.g. welding, whereas the other lead terminal 8 is connected to the cathode film 6 of the chip body 2, and the entirety is sealed in a package body 9 made of a synthetic resin. In this way, a solid electrolytic capacitor 10 as a finished product is provided.

In the capacitor element 1, the anode bar 3 projects from the end surface 2a of the chip body 2. Therefore, in the process of assembling the capacitor element 1 into the solid electrolytic capacitor 10, stress is exerted on the root portion of the anode bar 3 connected to the end surface 2a of the chip body 2. The stress may produce a crack in the dielectric film 4 on the end surface 2a of the chip body 2.

The crack formed in the dielectric film 4 causes electrical connection between the solid electrolyte layer 5 formed on the dielectric film 4 and the valve metal particles (anode side), which considerably increases the possibility that the capacitor element becomes defective before the element is assembled into the solid electrolytic capacitor 10.

DISCLOSURE OF THE INVENTION

An object of the present invention is to provide a capacitor element which is capable of reliably preventing damage of the dielectric film.

Another object of the present invention is to provide a method of making a capacitor element which is capable of reliably preventing damage of the dielectric film.

According to a first aspect of the present invention, there is provided a capacitor element for a solid electrolytic capacitor, which comprises a chip body prepared by compacting valve metal powder into a porous body and sintering the body, and an anode bar fixed to the chip body so as to project from an end surface of the chip body. The capacitor element further includes a solid electrolyte layer of conductive polymer formed on the chip body via a dielectric film, and a cathode film formed on the solid electrolyte layer. The solid electrolyte layer at the end surface of the chip body includes a carbide portion formed by pyrolysis of the solid electrolyte layer so as to surround the entire circumference of the anode bar.

According to a second aspect of the present invention, there is provided a method of making a capacitor element for a solid electrolytic capacitor comprising the steps of: compacting and sintering valve metal powder to prepare a porous chip body provided with an anode bar projecting from an end surface of the chip body; forming a dielectric film on the chip body; forming a solid electrolyte layer of conductive polymer on the dielectric film; and forming a cathode film on the solid electrolyte layer. After the solid electrolyte layer forming step, a carbonization step is performed which carbonizes, by pyrolysis, a portion of the solid electrolyte layer at the end surface of the chip body so as to surround the entire circumference of the anode bar.

Preferably, the step of carbonizing the solid electrolyte layer is performed by laser beam irradiation.

As noted above, a carbide portion is formed by pyrolysis of the solid electrolyte layer at the end surface of the chip body so as to surround the anode bar fixed to the end surface. The carbide portion, whose original conductive molecular structure has been broken, is an insulator. Therefore, even when damage due to e.g. stress acting on the anode bar occurs at the dielectric film on the end surface of the chip body around the root portion of the anode bar, electrical conduction between the solid electrolyte layer (cathode side) and the valve metal particles (anode side) can be reliably prevented.

Therefore, as compared with the prior art method, the possibility that the capacitor element becomes defective before the capacitor element is assembled into a solid electrolytic capacitor can be considerably reduced.

Particularly when the carbonization is performed by laser beam irradiation, the pyrolysis to form carbide can be performed in a short period of time, which leads to the reduction of the thermal load on the capacitor element and the reduction of the manufacturing cost.

BEST MODE FOR CARRYING OUT THE INVENTION

Figure 1:
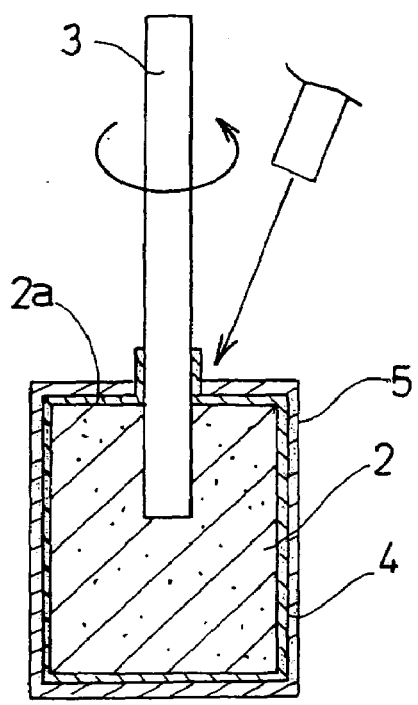
FIG. 1 illustrates a manufacturing method according to the present invention.
Figure 2:
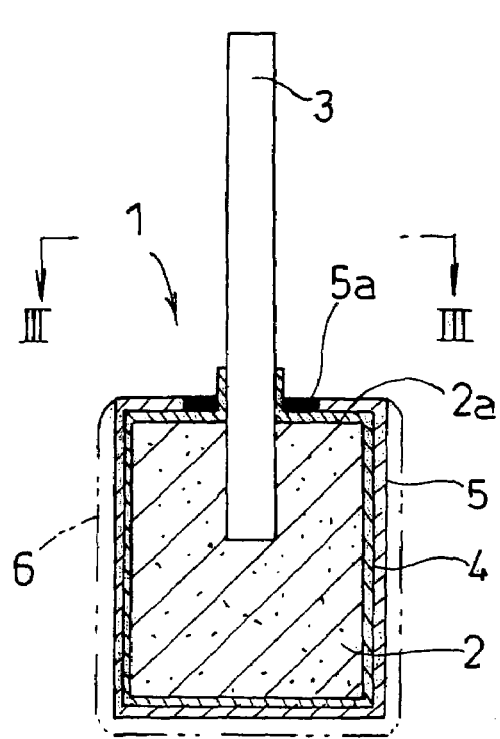
FIG. 2 is a vertical sectional view showing the capacitor element manufactured by the method of the present invention.
Figure 3:
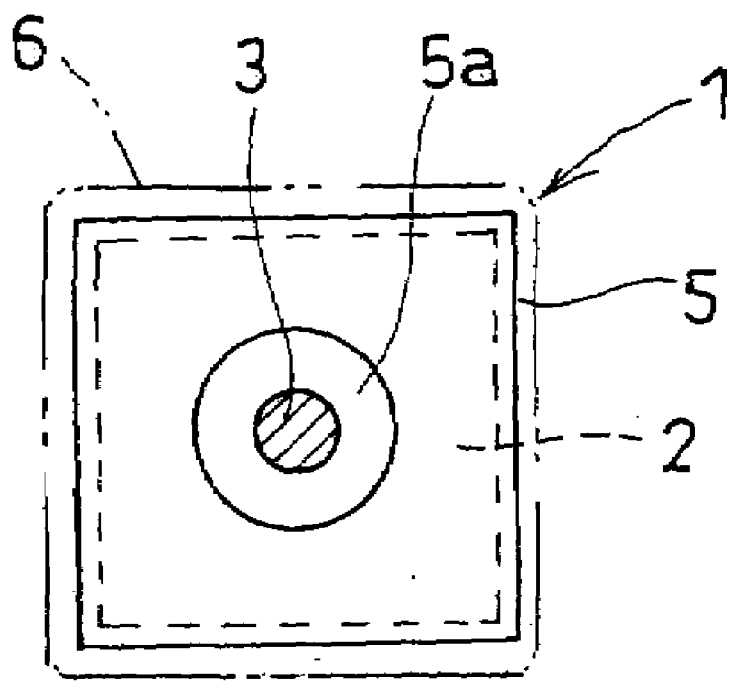
FIG. 3 is a sectional view taken along lines III—III in FIG. 2
Figure 4:
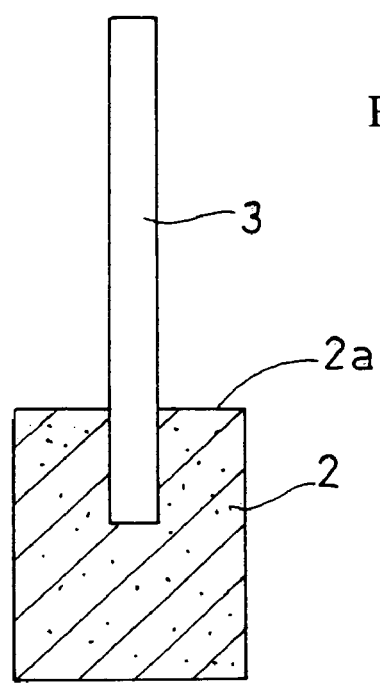
FIG. 4 is a vertical sectional view showing the chip body of a prior art capacitor element.
Figure 5:
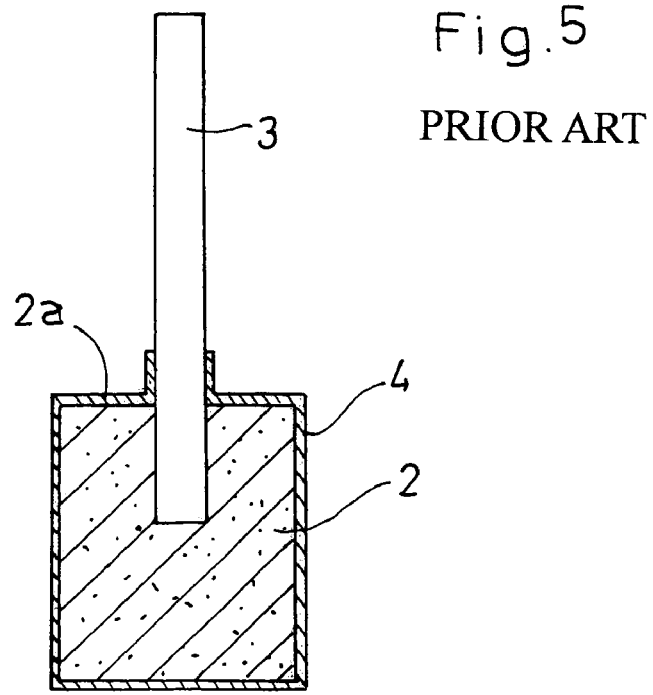
FIG. 5 is a vertical sectional view showing the chip body after a dielectric film is formed.
Figure 6:
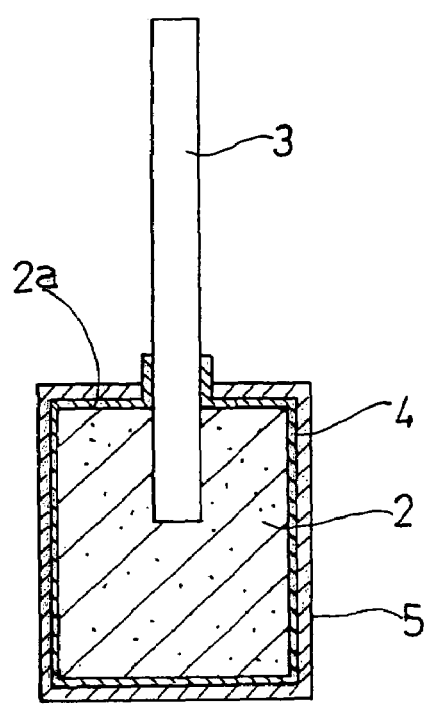
FIG. 6 is a vertical sectional view showing the chip body after a solid electrolyte layer is formed.

Preferred embodiments of the present invention will be described below with reference to FIGS. 1–3 of the accompanying drawings.

Figure 7:
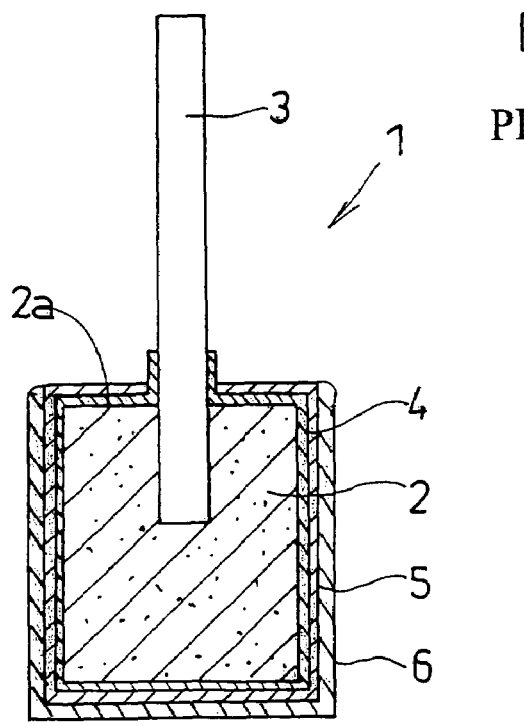
FIG. 7 is a vertical sectional view showing the chip body after a cathode film is formed.
Figure 8:
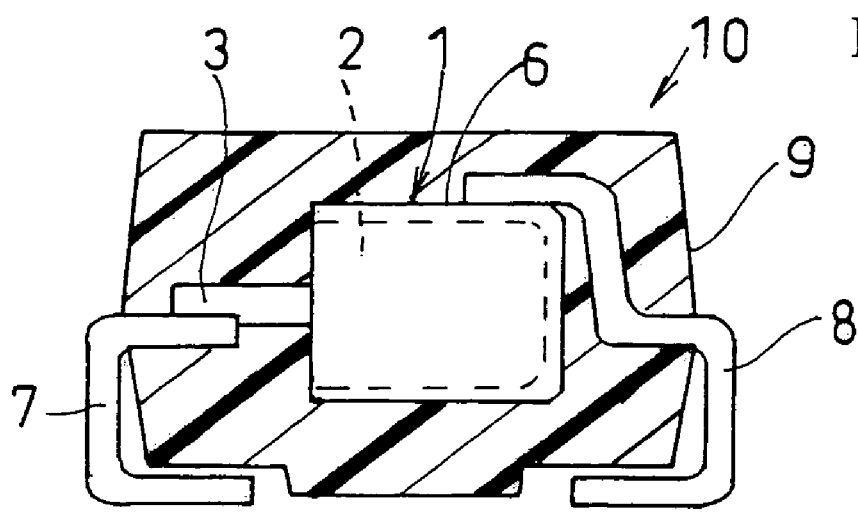
FIG. 8 is a vertical sectional view showing a solid electrolytic capacitor in which the capacitor element is incorporated.

In these figures, similarly to FIG. 7 showing the prior art structure, the reference numeral 2 indicates a chip body provided by compacting valve metal powder such as tantalum powder into a porous body and sintering the porous body. An anode bar 3 is partially inserted in and fixed to the chip body 2 to project outward from an end surface 2a of the chip body.

Similarly to the prior art, by performing anodizing, i.e. immersing the chip body 2 in chemical conversion liquid and applying a voltage, a dielectric film 4 of e.g. tantalum pentoxide is formed on particle surfaces of the valve metal powder of the chip body 2 and the root portion of the anode bar 3.

Similarly to the prior art, on the obverse surface of the dielectric film 4 formed on the chip body 2, a solid electrolyte layer 5 of a conductive polymer is formed so that the solid electrolyte layer 5 extends up to the end surface 2a of the chip body 2. Examples of preferable conductive polymers include polyethylene dioxythiophene and polypyrrole.

To the end surface 2a of the chip body 2, a laser beam from a laser irradiation apparatus 7 is applied. In this state, as indicated by the arrow in FIG. 1, the chip body 2 is rotated at least once on the anode bar 3 as a center axis or the laser irradiation apparatus 7 is revolved at least once around the anode bar 3. In this way, the portion of the solid electrolyte layer 5 surrounding the entire circumference of the anode bar 3 at the end surface 2a of the chip body 2 is carbonized by pyrolysis to be turned into carbide 5a. The carbonization process may be performed in air or in an atmosphere without air (oxygen). However, when the carbonization is to be performed in air, a condition in which carbon in the conductive polymer is not oxidized need be selected.

Of the solid electrolyte layer 5, the portion of carbide 5a, whose original conductive molecular structure has been broken by carbonization, is an insulator which resists the flow of electric charge. Therefore, even when damage due to e.g. stress acting on the anode bar 3 occurs at the dielectric film 4 around the root portion of the anode bar 3 on the chip body 2, electrical conduction between the solid electrolyte layer 4 and the valve metal particles (anode side) can be reliably prevented.

The treatment to turn the portion of the solid electrolyte layer 5 surrounding the anode bar 3 into carbide 5a by pyrolysis may be performed by blowing flame or hot wind instead of laser beam irradiation. However, with the laser beam irradiation, the pyrolysis for forming carbide can be performed in an extremely short period of time.

Similarly to the prior art, a cathode film 6 having a two-layer structure consisting of a graphite layer as the underlying layer and a metal layer as the upper layer is formed on the solid electrolyte layer 5, whereby a complete capacitor element is provided. The treatment to turn the portion of the solid electrolyte layer 5 surrounding the anode bar 3 into carbide 5a by pyrolysis may be performed after the cathode film 6 is formed.

The invention claimed is:

1. A capacitor element for a solid electrolytic capacitor, the capacitor element comprising: a chip body prepared by compacting valve metal powder into a porous body and sintering the body; an anode bar fixed to the chip body so as to project from an end surface of the chip body; a solid electrolyte layer of conductive polymer formed on a dielectric film on the chip body; and a cathode film formed on the solid electrolyte layer;

wherein the solid electrolyte layer at the end surface of the chip body includes a carbide portion formed by pyrolysis of the solid electrolyte layer so as to surround an entire circumference of the anode bar.

2. A method of making a capacitor element for a solid electrolytic capacitor, the method comprising the steps of: compacting and sintering valve metal powder to prepare a porous chip body provided with an anode bar projecting from an end surface of the chip body; forming a dielectric film on the chip body; forming a solid electrolyte layer of conductive polymer on the dielectric film; and forming a cathode film on the solid electrolyte layer;

wherein the method further comprises the step of carbonizing, by pyrolysis, a portion of the solid electrolyte layer at the end surface of the chip body so as to surround an entire circumference of the anode bar, the carbonization step being performed after the solid electrolyte layer forming step.

3. The manufacturing method according to claim 2, wherein the step of carbonizing the solid electrolyte layer is performed by laser beam irradiation.

* * * * *